US008875761B2

(12) United States Patent
French

(10) Patent No.: US 8,875,761 B2
(45) Date of Patent: Nov. 4, 2014

(54) SYSTEM AND METHOD OF SECURING A PNEUMATIC TIRE TO A RIM

(75) Inventor: George Robert French, Sheffield (GB)

(73) Assignee: Bear Corporation, Cerritos, CA (US)

( * ) Notice: Subject to any disclaimer, the term of this patent is extended or adjusted under 35 U.S.C. 154(b) by 242 days.

(21) Appl. No.: 13/350,425

(22) Filed: Jan. 13, 2012

(65) Prior Publication Data
US 2013/0180641 A1 Jul. 18, 2013

(51) Int. Cl.
*B60C 15/032* (2006.01)
*B60C 5/08* (2006.01)
*B60C 5/22* (2006.01)
*B60C 17/01* (2006.01)

(52) U.S. Cl.
CPC ............ *B60C 15/032* (2013.01); *B60C 5/22* (2013.01)
USPC ....... 152/400; 152/341.1; 152/512; 428/36.1; 428/36.8

(58) Field of Classification Search
CPC ............ B60C 5/025; B60C 5/04; B60C 5/08; B60C 5/20; B60C 5/22; B60C 5/24; B60C 15/032; B60C 17/01
USPC .......... 152/331.1, 333.1, 334.1, 337.1, 338.1, 152/339.1, 340.1, 341.1, 342.1, 400, 511, 152/512; 428/36.1, 36.2, 36.8, 36.9
See application file for complete search history.

(56) References Cited

U.S. PATENT DOCUMENTS

| 1,653,054 | A | 12/1927 | Mack | |
|---|---|---|---|---|
| 1,925,031 | A | 8/1933 | Chitester | 152/22 |
| 1,962,143 | A | 6/1934 | Ford | 152/22 |
| 2,190,202 | A | 2/1940 | Arey | 154/14 |
| 2,200,916 | A | 5/1940 | Crowley | 152/342 |
| 2,207,212 | A | 7/1940 | Arey | 152/342 |
| 2,216,368 | A | 10/1940 | Hollingshead | 152/342 |
| 2,244,941 | A | 6/1941 | Degnon | 152/341 |
| 2,264,164 | A | 11/1941 | Krusemark | 152/342 |

(Continued)

FOREIGN PATENT DOCUMENTS

| DE | 2355453 | 5/1975 | |
|---|---|---|---|
| FR | 2723036 | 2/1996 | ............ B60C 15/032 |
| GB | 1 571 916 | 1/1977 | ............ B60C 17/04 |
| JP | 8058306 | 3/1996 | ............ B60C 15/032 |

OTHER PUBLICATIONS

International Search Report and Written Opinion; PCT/US2013/020537; pp. 11, Mar. 25, 2013.

(Continued)

*Primary Examiner* — Richard Crispino
*Assistant Examiner* — Robert Dye
(74) *Attorney, Agent, or Firm* — Baker Botts L.L.P.

(57) ABSTRACT

In accordance with embodiments of the present disclosure an inner tube comprises an encasing configured to hold air. The encasing comprises a reinforcing structure configured such that, as the encasing is inflated, an overall major diameter of the inner tube is reduced. The inner tube also comprises an inflation valve coupled to the encasing and configured to allow inflation of the encasing. Further, the inner tube comprises a pressure valve coupled to the encasing. The pressure valve is configured to be biased closed and allow air to leave the encasing when a differential pressure between inside of the encasing and outside of the encasing reaches a threshold pressure level. In the same or alternative embodiments, the encasing also comprises a reinforcing structure configured such that, as the encasing is inflated, an overall major diameter of inner tube is reduced.

20 Claims, 5 Drawing Sheets

(56) References Cited

U.S. PATENT DOCUMENTS

| | | | | |
|---|---|---|---|---|
| 2,268,370 A | 12/1941 | Barkeij | | 152/342 |
| 2,272,896 A | 2/1942 | Pidgeon | | 152/342 |
| 2,290,687 A | 7/1942 | Kraft | | 152/342 |
| 2,301,096 A | 11/1942 | Truscott | | 277/71 |
| 2,308,955 A | 1/1943 | Wilson et al. | | 152/430 |
| 2,334,893 A | 11/1943 | Arey | | 152/342 |
| 2,343,828 A | 3/1944 | Burkley | | 152/342 |
| 2,375,127 A | 5/1945 | Mendelsohn | | 152/339 |
| 2,391,841 A | 12/1945 | Mendelsohn | | 152/342 |
| 2,399,572 A | 4/1946 | Powell et al. | | 152/400 |
| 2,404,578 A | 7/1946 | Liska | | 152/342 |
| 2,554,815 A | 5/1951 | Church | | 152/342 |
| 2,685,905 A | 8/1954 | Chandley | | 152/342 |
| 2,823,115 A | 2/1958 | Whitehead et al. | | 75/168 |
| 2,874,744 A | 2/1959 | Trainer | | 152/342 |
| 2,898,969 A | 8/1959 | Pfeiffer | | 152/341 |
| 2,905,221 A | 9/1959 | Nonnamaker | | 152/341 |
| 2,991,821 A | 7/1961 | Williams | | 152/427 |
| 3,145,754 A | 8/1964 | Sarris | | 152/342 |
| 3,945,419 A | 3/1976 | Kosanke | | |
| 4,054,169 A | 10/1977 | Devienne et al. | | 152/337 |
| 4,143,697 A | 3/1979 | Igea et al. | | 152/340 |
| 5,301,729 A | 4/1994 | Blair | | 152/342.1 |
| 5,385,191 A * | 1/1995 | Aflague et al. | | 152/340.1 |
| 5,538,061 A | 7/1996 | Blair | | 152/342.1 |
| 5,891,278 A | 4/1999 | Rivin | | 152/418 |
| 6,257,676 B1 | 7/2001 | Lacombe et al. | | 301/58 |
| 6,516,849 B2 | 2/2003 | Flament et al. | | 152/400 |

OTHER PUBLICATIONS

International Preliminary Report on Patentability; PCT/US2013/020537; pp. 8, Jul. 24, 2014.

* cited by examiner

SYSTEM AND METHOD OF SECURING A PNEUMATIC TIRE TO A RIM

TECHNICAL FIELD

The present disclosure relates in general to pneumatic tires, and more particularly to a system and method of securing a pneumatic tire to a rim.

BACKGROUND

Pneumatic tires can be very efficient. Their relatively thin, solid structure, combined with an air volume, suffers low losses due to hysteresis while conforming to the shape of the ground to gain traction and grip. However, pneumatic tires also have disadvantages in that they are vulnerable to impacts and damage that can cause the tire to lose air.

For example, conventional clincher bicycle tires traditionally use an inner tube that is separate from the tire to retain the air. In such a structure, the tire is mounted on the rim of the bicycle wheel with the inner tube placed inside of the inner casing of the tire. The tire is inflated by filling the inner tube with air and the inner tube fills the tire casing entirely.

A conventional inner tube structure is vulnerable to different types of punctures, such as "pinch" and "piercing" punctures. In a "pinch" puncture, the tire may strike an obstacle (e.g., a rock, a curb, a ledge) such that the tire is compressed toward the rim of the wheel. When the tire compresses, the inner tube is pinched between the tire casing and the edge of the rim of the wheel upon which the tire is mounted, which may add a significant amount of stress to the inner tube. Additionally, upon striking the obstacle, the inner tube may be nipped against the hard edge created by the rim and the obstacle. In this situation the tube may be stretched beyond its elastic limit, typically creating two holes in the tube which then allow the air inside the tube to escape rapidly.

In a "piercing" puncture, a sharp object passes through both the tire and tube to create a hole that allows the air to escape from the tube. Piercing punctures may be addressed by the addition of a liquid sealant to the inner tube that can block many smaller holes. However, in a traditional inner tube system, the sealant effectiveness may be reduced because the tube may move relative to the tire casing while a sharp object is still embedded in the tire casing, thus, reopening the hole in the tube or creating new holes in the tube. A sealant set-up with an inner tube may also add more weight to a wheel that already has extra weight due to the presence of an inner tube and a tire.

Further, inner-tube systems may increase the likelihood of damaging the valve stem used to inflate the tube. For example, forces exerted on the tire may cause the tire to rotate, which in turn may cause the tube to rotate with respect to the rim. In such instances, the valve stem of the tube that is passing through a hole in the rim may become damaged due to the rotation of the tube.

An alternative system for holding air in a clincher tire is the "tubeless" method. In a tubeless system, the bead of the tire may seal against the rim to hold air inside of the tire without the use of an inner tube. A tubeless system is much less vulnerable to "pinch" punctures as there is no separate tube to pinch, and piercing punctures can also be largely addressed by the addition of a liquid sealant to the tire which can block many smaller holes. The additional weight of the sealant may be less worrisome due to any additional weight associated with an inner tube being removed. Additionally, the sealant may be more effective in a tubeless tire because the puncturing object may not create more than the original hole in the tire.

However, the tubeless systems currently in use also have problems. For example, although tubeless systems are effectively immune to pinch punctures associated with inner-tube systems, an impact that might normally cause a pinch puncture in an inner-tube system may be capable of pushing the bead of the tubeless tire away from the rim, allowing for a sudden loss of air. Additionally in some instances (e.g., with lower pressures that may be desirable in some applications such as off-road use), there is also a risk of an impact damaging the sidewall of the rim. Once the rim is damaged in a tubeless system, the seal at this junction is also likely to be compromised such that air may escape. Additionally, in some instances under heavy cornering loads (e.g., with low pressures), the sidewall of the tire may be forced away from the rim, allowing for a sudden loss of air.

Further, to achieve the desired tight fit of a tubeless system, special tires and rims may be required to achieve a tight fit between the rim and the tire bead to try to maintain a good seal and to increase the force required to separate the bead of the tire from the rim's sidewall, to reduce the likelihood of the air escaping. While this may be effective, it can make the seating of the tire onto the rim much more difficult and it is still relatively common to encounter a situation in which the side loads pull the rim bead away from the tire, allowing the air from inflation to escape.

Another drawback with tubeless designs is that inflation can be difficult since air tends to leak until the tire bead is fully seated and held in place against the rim by air pressure. Typically, a supply of air is required at a rate that is not easily achieved outside of a workshop (e.g., during a repair by the user at the road or trail side). Without a sufficiently rapid supply of air, quickly pushing the tire out and into position in order to create a seal can be very difficult to achieve. This means that many riders may feel the need to carry an inner-tube or tubes as a reliable means of re-inflating a deflated tire at the side of the bicycle trail, should it be necessary.

Yet another problem with tubeless tires is that the seal at the rim often leaks slightly. Sealant is somewhat effective at eliminating these leaks, but there is still flexure of the tire that occurs during use because this junction is subject to movement. Since the tire is sealed over a relatively small area, and it is not firmly held closed, it is common for it to re-open and begin to leak slowly again. Damage to the rim from impacts can magnify this problem significantly.

The typical tubeless system has yet another issue in that it can be difficult to move the wheel to a position in which sealant lies against the bead and rim joint in order to seal such leaks. With a large volume tire, laying the wheel on its side causes the sealant to sit in the tumblehome (side curve) of the tire, rather than against the bead-rim interface. It is typically necessary to manually shake the wheel in order to "slosh" the sealant up to the leaking bead-rim interface, and this method is commonly demonstrated by sealant manufacturers. This procedure is laborious and time consuming and requires some skill from the user to complete it successfully. It also requires the removal of the wheel from the bicycle to perform the task, which also adds an inconvenience.

SUMMARY

In accordance with the teachings of the present disclosure, the disadvantages and problems associated with conventional inner tube and tubeless tire systems are reduced or eliminated.

In accordance with embodiments of the present disclosure an inner tube comprises an encasing configured to hold air. The encasing comprises a reinforcing structure configured such that, as the encasing is inflated, an overall major diameter of the inner tube is reduced. The inner tube also comprises an inflation valve coupled to the encasing and configured to allow inflation of the encasing. Further, the inner tube comprises a pressure valve coupled to the encasing. The pressure valve is configured to be biased closed and allow air to leave the encasing when a differential pressure between inside of the encasing and outside of the encasing reaches a threshold pressure level. In the same or alternative embodiments, the encasing also comprises a reinforcing structure configured such that, as the encasing is inflated, an overall major diameter of inner tube is reduced.

Technical advantages of the present disclosure will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1-4, wherein like numbers are used to indicate like and corresponding parts.

Figure 1A:
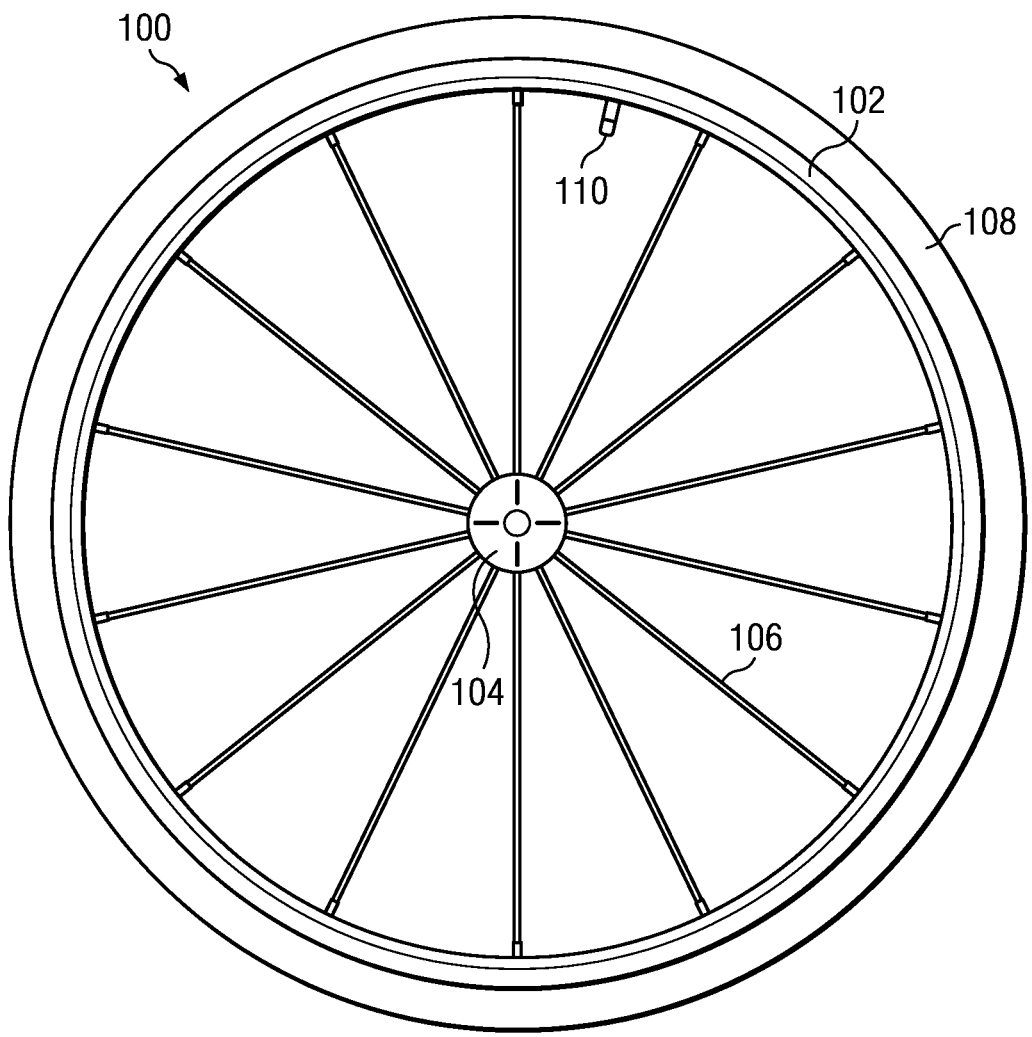
FIG. 1A illustrates an example wheel configured according to some embodiments of the present disclosure.

FIG. 1A illustrates a wheel 100 configured according to some embodiments of the present disclosure. Wheel 100 may also comprise a tire 108 mounted on a rim 102 according to the present disclosure to reduce problems associated with traditional inner tube and tubeless systems, as disclosed in further detail below. Rim 102 may be coupled to a hub 104 via a plurality of spokes 106. Spokes 106 may be any suitable type of spoke made from any suitable type of material configured in any suitable manner for coupling hub 104 to rim 102.

Rim 102 may comprise any suitable type of rim for housing tire 108. Rim 102 may comprise a standard rim and tire 108 may comprise a standard tire. For example, in the illustrated embodiment, rim 102 may comprise a standard, commercially available mountain bike rim that may be used with a traditional inner tube system and tire 108 may comprise a standard mountain bike tire that may be used with the standard mountain bike rim.

Figure 1C:
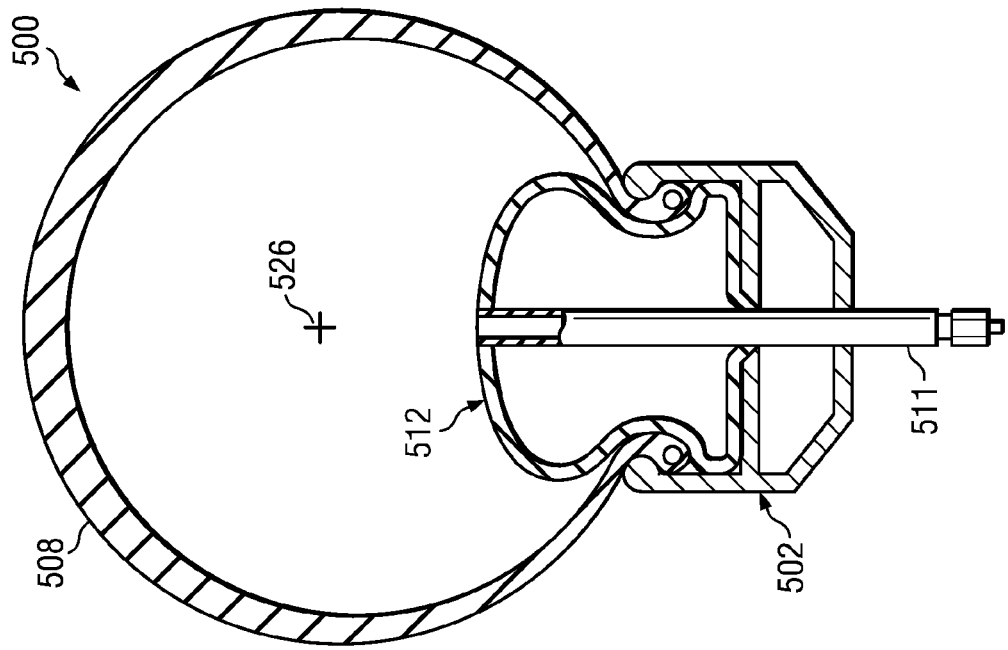
FIG. 1C illustrates a cross section of a prior art wheel configuration.
Figure 1B:
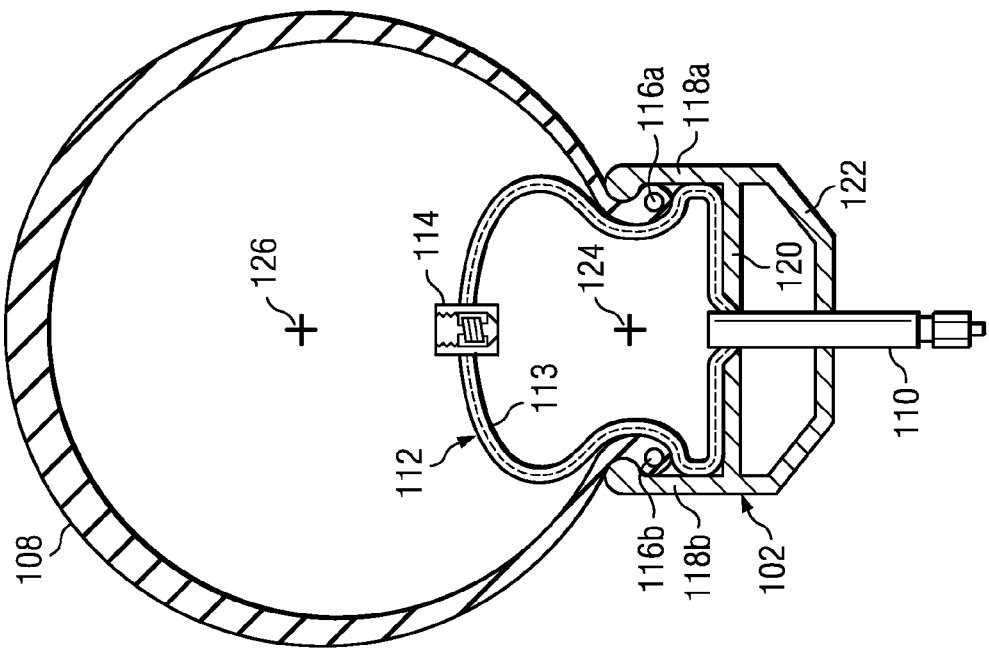
FIG. 1B illustrates a cross section of the wheel of FIG. 1A, according to some embodiments of the present disclosure.

FIG. 1B illustrates a cross sectional view of wheel 100. As shown in FIG. 1B, wheel 100 may include an inner tube 112 housed inside of tire 108 and within a channel defined by an upper bridge 120 and of flanges 118a and 118b of rim 102. As described in further detail below, a volume 124, defined within an encasing 113 of inner tube 112 configured to hold air, and a volume 126 of tire 108 may be inflated to their respective air pressures by connecting a pump to a valve 110 of inner tube 112 that may pass through a hole in rim 102. Volume 124 may be inflated first and, as described in further detail below, as volume 124 of inner tube 112 is inflated, inner tube 112 may push beads 116 of tire 108 against flanges 118 of rim 102 to seat tire 108 against rim 102. Additionally, as volume 124 of inner tube 112 is filled with air, inner tube 112 may seat against upper bridge 120 of rim 102 to seal any holes that may be in rim 102, such as spoke holes or a valve hole. Therefore, after volume 124 is sufficiently inflated, volume 126 of tire 108 may be sufficiently sealed such that volume 126 may be inflated. Such a configuration may utilize the advantages of inner tube and tubeless wheel systems while also reducing the respective disadvantages of each system as described in further detail below. Additionally, as described in further detail, the present disclosure may reduce problems associated with some prior art hybrid inner tube/tubeless systems (referred to herein as "hybrid systems").

Like a standard inner tube, valve 110 may be fitted on the inner wall of inner tube 102. Valve 110 may be any suitable valve, including any standard valve (e.g., a Presta or Schrader valve). However, unlike a standard tube, inner tube 112 may also include a pressure valve 114 fitted on the outer wall of inner tube 102. Pressure valve 114 may be placed at any suitable location along inner tube 112 and may or may not be aligned with valve 110.

Pressure valve 114 may be configured to be biased closed, but may open when a certain differential pressure exists between the two sides of the valve. For example, pressure valve 114 may include a spring configured to bias pressure valve 114 closed. But, when the pressure of volume 124 as compared to the pressure of volume 126 is sufficiently high, the pressure of volume 124 may overcome the force exerted by the spring, such that pressure valve 114 may open and allow air to pass from volume 124 of inner tube 112 to volume 126 of tire 108 during inflation of volumes 124 and 126.

To inflate volumes 124 and 126 of inner tube 112 and tire 108, respectively, any pump suitable for engaging with valve 110 may be coupled to valve 110. Upon commencement of pumping, inner tube 112 may inflate until the pressure of volume 124 with respect to the pressure of volume 126 (this relationship between the pressures in volumes 124 and 126 may also be referred to as the differential pressure between volume 124 and volume 126) reaches a threshold pressure such that pressure valve 114 opens (e.g., the pressure in volume 124 is 4.0 atmospheres greater than the pressure in volume 126) to allow air to pass from volume 124 to volume 126 of tire 108. Pressure valve 114 may close once the differential pressure between volume 124 and volume 126 returns to being less than the threshold pressure associated with pressure valve 114 opening (e.g., 4.0 atmospheres (atm.)).

To inflate volume 126 of tire 108 to a desired pressure, the user merely needs to attach a pump to valve 110 and pump air into volumes 124 and 126 through valve 110 until the pressure measured at valve 110 is the sum of the known differential pressure between volumes 124 and 126 and the desired pressure. For example, the differential threshold pressure of pressure valve 114 may be 4.0 atm. and the desired pressure of volume 126 may be 1.5 atm. Therefore, a user may pump air through valve 110 until the measured pressure at valve 110 is 5.5 atm, indicating that the pressure of volume 126 may be approximately 1.5 atm because of the differential threshold pressure of 4.0 atm. between volume 124 and volume 126. In some embodiments, the differential pressure at which pressure valve 114 opens may be printed on inner tube 112 and/or supplied with packaging of inner tube 112.

Further, in the same or alternative embodiments, pressure valve 114 may be adjusted such that pressure valve 114 opens at a different differential pressure. This may be accomplished by advancing or retracting an advancement screw. Therefore, a user may be able to adjust the pressure between volumes 124 and 126 to a desired pressure depending on the riding circumstances. For example on a downhill bike, the rider may want to run with volume 126 at a relatively low pressure (e.g., 1.3 atm.) and have a relatively high pressure (e.g., 8.0 atm.) in volume 124 of tube 112 to help protect rim 102 and strongly lock beads 116 against flanges 118 of rim 102. Therefore, in this example, the threshold pressure of pressure valve 114 may be set at 6.7 atm.

In contrast, in another instance the rider may want to run at a relatively high pressure in volume 126 for efficient rolling on hard surfaces (e.g., roads) and keep the volume 124 at a moderate pressure to minimize the chances of damaging rim 102 because rim 102 may be relatively weak. In such instances, the threshold pressure of pressure valve 114 may be set to a somewhat lower pressure than the downhill rider example (e.g., 2.0 atm.). Thus, allowing volume 126 to be at a relatively higher pressure (e.g., 2.5 atm.) while the pressure within volume 124 of inner tube 112 is sufficiently low enough (e.g., 4.5 atm.) to unlikely cause any damage to rim 102.

The pressure associated with pressure valve 114 opening may also be selected such that volume 124 of inner tube 112 is filled with enough air and has enough pressure before pressure valve 114 opens that inner tube 112 may sufficiently seat beads 116a and 116b of tire 108 against flanges 118a and 118b, respectively, of rim 102. Therefore, volume 126 may substantially fill with air when pressure valve 114 opens without the air leaking out of volume 126 because a sufficient seal between beads 116a and 116b and flanges 118a and 118b may be present. Because volume 124 of inner tube 112 may be filled using a pump with relatively slow air flow and volume 126 is filled via volume 124 and pressure valve 114 after a sufficient seal between beads 118 and flanges 118 has been established, volume 126 of tire 108 may also be filled using such a pump. Thus, in instances where a pump with fast airflow is not available (e.g., during a ride), volume 126 of tire 108 may be inflated. In contrast, in a traditional tubeless system, inflation with a pump with relatively slow airflow (e.g., a hand pump) may be extremely difficult or impossible.

Additionally, the presence of pressure valve 114 allows for both volumes 124 and 126 to be inflated by securing a pump to valve 110 in a manner similar to inflating a tire with a traditional inner tube system. Accordingly, rim 102 of the present disclosure may be a standard rim that includes a single hole to allow valve 110 to pass through rim 102. In contrast, some prior art hybrid systems may require two valves—one to fill the inner tube and one to fill the tire cavity—such that a special rim having two holes to allow passage of both valve stems through the rim may be required.

Further, the two valves of some prior art hybrid systems also require a valve and associated valve stem to pass all the way through the inner tube to reach the tire cavity. FIG. 1C illustrates an example of a prior art hybrid system 500 with a valve 511 that passes all the way through an inner tube 512 of system 500 to tire cavity 526 of a tire 508 of system 500. System 500 includes another valve (not expressly shown) offset from valve 511 along rim 502, that is used to inflate inner tube 512, similar to valve 110 of FIGS. 1A and 1B. Such a configuration may create additional problems such as causing a poor fit between the inner tube and rim due to uneven expansion of the inner tube caused by the valve passing all the way through the tuber. Further, the valve passing all the way through the inner tube may interfere with the seal between the tire beads and rim in the area proximate the valve. Therefore, pressure valve 114 of the present disclosure, as shown in FIG. 1B, may reduce or eliminate problems associated with some prior art hybrid systems by not requiring a valve that passes all the way through inner tube 112, in contrast to the example of a prior art hybrid system shown in FIG. 1C.

Unlike traditional inner tube systems, inner tube 112 may be sized such that it does not substantially fill the entire inner cavity of tire 108 and may also overhang flanges 118 of rim 102 to a lesser degree than traditional inner tube systems such that pinching punctures may be substantially reduced. As previously described, a pinching puncture may occur when the tire strikes an obstacle (e.g., a rock, a curb, a ledge) such that the tire is compressed toward the rim of the wheel. In a traditional inner tube system where the inner tube substantially fills the entire inner cavity of a tire, when the tire compresses upon hitting the obstacle, the inner tube also compresses with the tire and may be pinched between the tire casing and the edge of the rim of the wheel upon which the tire is mounted, which may puncture the tire.

Figure 2A:
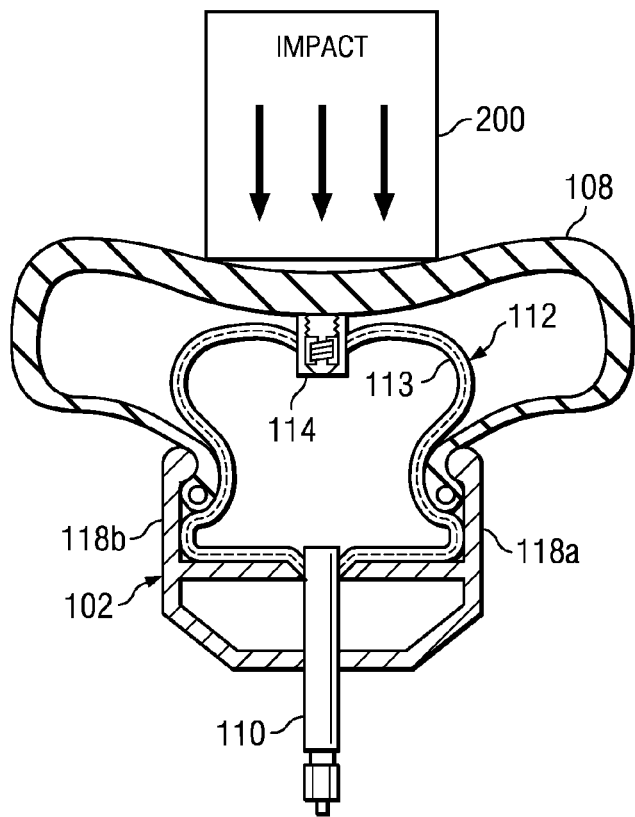
FIG. 2A illustrates an example of an impact that may be sustained by a wheel configured according to some embodiments of the present disclosure.

In contrast, as shown in FIG. 2A, when tire 108 strikes an obstacle 200, inner tube 112 may compress, but not as much as tire 108 due to its increased pressure and also smaller size with respect to tire 108, which may reduce the likelihood or degree that inner tube 112 may be pinched against flanges 118a and 118b of rim 102 to cause a pinch puncture. Further, as described above, the air pressure inside of inner tube 112 may be higher than the air pressure inside of tire 108 such that inner tube 112 may compress less than tire 108 if tire 108 is compressed sufficiently to reach inner tube 112, which may further reduce the likelihood of a pinch puncture. In addition, with inner tube 112 inflated at a sufficiently high pressure, inner tube 112 may reduce the likelihood of the object striking and damaging rim 102.

Figure 2B:
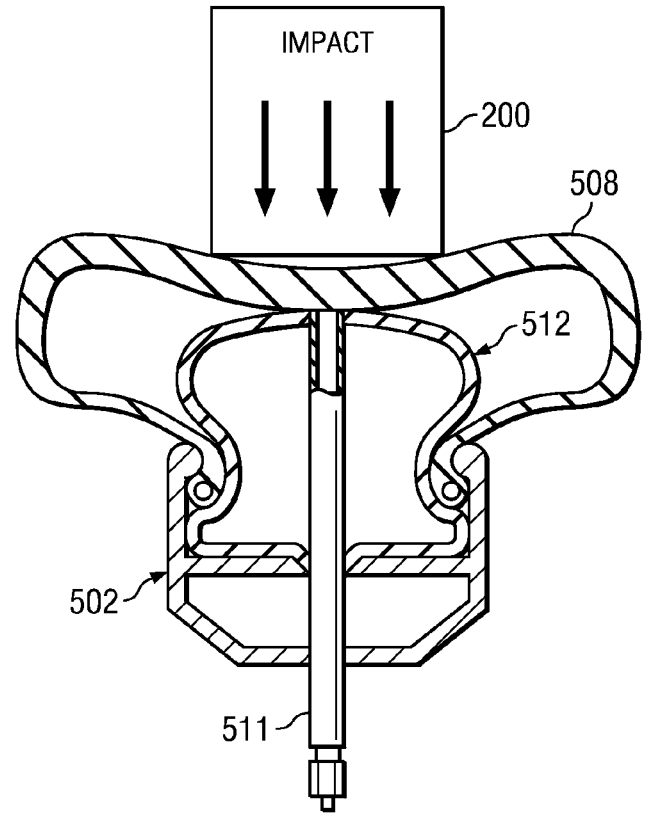
FIG. 2B illustrates an example of an impact that may be sustained by the prior art wheel configuration of FIG. 1C.

Further, as shown in FIG. 2A, pressure valve 114 is also configured to move with compression of inner tube 112 that may occur if inner tube 112 strikes an object (e.g., obstacle 200). Therefore, if pressure valve 114 is subject to a fairly direct hit with an object, pressure valve 114 may move with the compression of inner tube 112, which may also reduce the likelihood of damaging pressure valve 114. In contrast, as shown in FIG. 2B, a prior art hybrid system with a rigid valve 511 that passes through inner tube 512 may not allow for as much energy absorption within inner tube 512 when tire 508 strikes an obstacle 200. Therefore, if an object 200 strikes tire 508 and tube 512 at the location of valve 511, more impact forces may be transferred to rim 502, which may leave rim 502 more prone to damage. Further, the impact forces may damage valve 511 that is passing through inner tube 512 because the rigid structure of valve 511 may receive much of the force from the impact.

Returning to FIG. 2A, additionally, as mentioned above, because the air pressure of volume 124 of inner tube 112 may be higher than the air pressure of volume 126 of tire 108, inner tube 112 may maintain a seal between beads 116 and flanges 118 of rim 102 even when volume 126 of tire 108 is at a relatively low pressure. Therefore, in situations where low pressure may be desired (e.g., in off road riding), the seal between beads 116 and flanges 118 may be sufficiently maintained even though tire 108 may move and compress due to the low pressure. In contrast, with traditional tubeless systems, low pressures may cause the beads of a tire to unseat from the rim, thus allowing air to more easily escape.

Also, because inner tube 112 firmly seats tire 108 against rim 102 (even in situations where the pressure of volume 126 is relatively low), tire 108 (and consequently inner tube 112) may be less likely to rotate with respect to rim 102. Therefore, the likelihood of valve 110 also rotating and being damaged by pressing against the side of the hole in rim 102 that allows valve 110 to pass through rim 102 may be reduced.

Figure 3A:
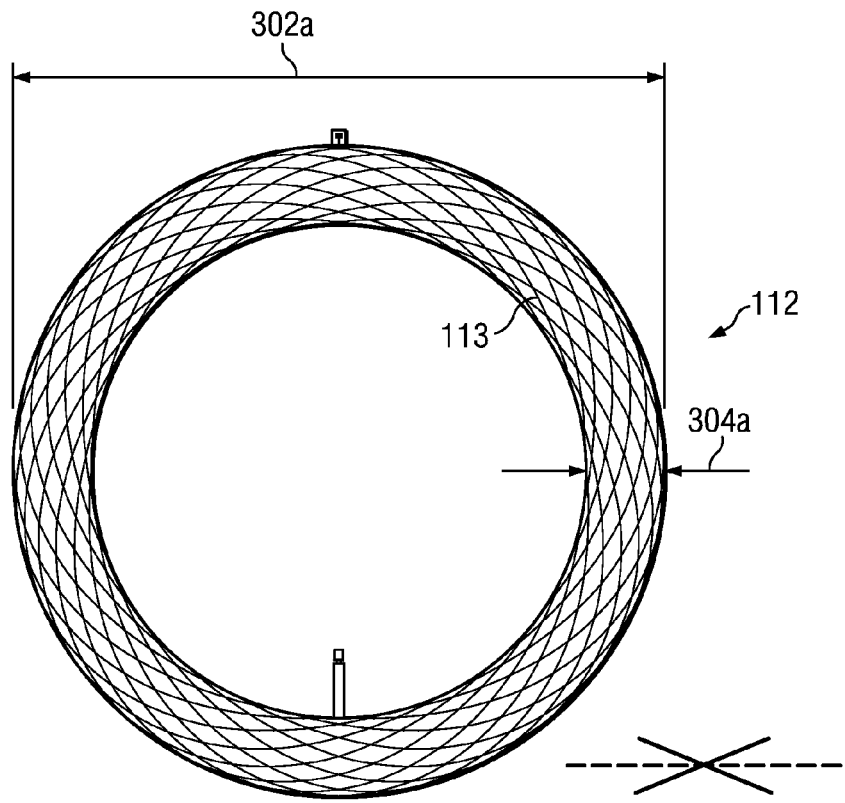
FIGS. 3A-3D illustrate an example of an inner tube configured according to some embodiments of the present disclosure.
Figure 3B:
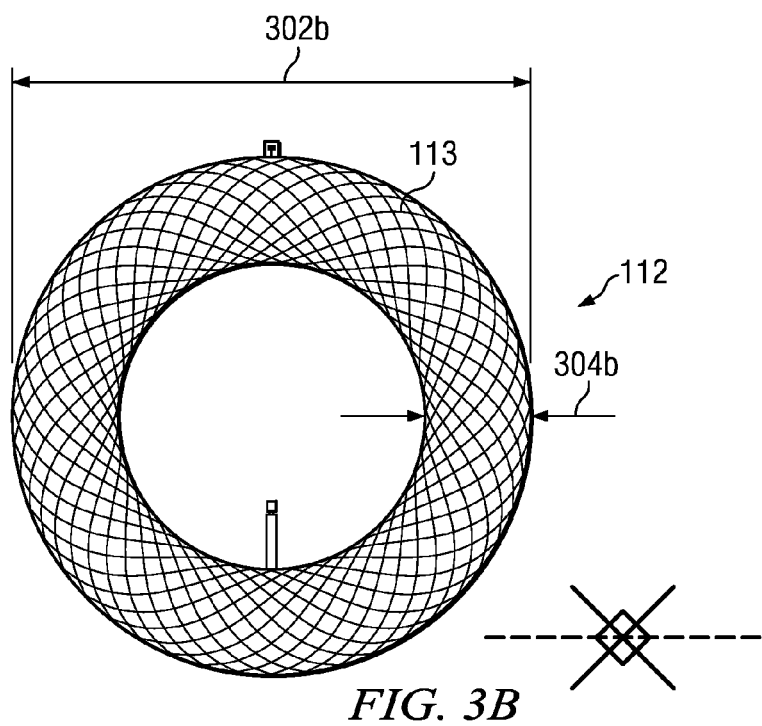

As shown in FIGS. 1B and 2A, and as mentioned above, inner tube 112 may be sized and configured such that inner tube 112 does not substantially fill the entire inner cavity of tire 108 defined between rim 102 and the inner surface of tire 108. Additionally, inner tube 112 may be configured to stay firmly seated against upper bridge 120 of rim 102 and between flanges 118 of rim 102. FIGS. 3A and 3B illustrate example embodiments of inner tube 112 configured to firmly seat against rim 102.

FIG. 3A illustrates inner tube 112 in a substantially deflated state, and FIG. 3B illustrates inner tube 112 in a substantially inflated state. Inner tube 112 may have a major diameter 302, which may be overall diameter of inner tube 112 as shown in FIGS. 3A and 3B. Inner tube 112 may also have a minor diameter 304, which may be the diameter of the tube portion of inner tube 112, as also shown in FIGS. 3A and 3B. Major diameter 302a of FIG. 3A may indicate the major diameter of inner tube 112 when inner tube 112 is substantially deflated. Additionally, minor diameter 304a of FIG. 3A may indicate the minor diameter of inner tube 112 when inner tube 112 is substantially deflated. Major diameter 302b of FIG. 3B may indicate the major diameter of inner tube 112 when inner tube 112 is substantially inflated and minor diameter 304b of FIG. 3B may indicate the minor diameter of inner tube 112 when inner tube 112 is substantially inflated.

As described above, inner tube 112 may be sized such that it does not substantially fill inner cavity 126 of tire 108 when inflated. For example, in some instances, inner tube 112 may be sized such that inner tube 112 fills approximately 40% or less of inner cavity 126 when inflated. Accordingly, major diameter 302 and minor diameter 304 of inner tube 112 may be sized to achieve such results. Due to the smaller size of inner tube 112 with respect to tire 108, inner tube 112 may be configured such that major diameter 302 decreases as minor diameter 304 increases. Such configuration may help ensure that inner tube 112 stays in its desired position within the channel of rim 102. For example, as shown in FIGS. 3A and 3B, minor diameter 304b may be larger than minor diameter 304a due to inner tube 112 being substantially inflated in FIG. 3B as compared to inner tube 112 being substantially deflated in FIG. 3A. Further, as shown in FIGS. 3A and 3B, as minor diameter 304 of inner tube 112 increases during inflation from minor diameter 304a to minor diameter 304b, major diameter 302 of inner tube 112 decreases from major diameter 302a to major diameter 302b.

Inner tube 112 may be configured such that when inner tube 112 is inflated and not placed on rim 102, major diameter 302b is somewhat smaller than the diameter of rim 102. Accordingly, when inner tube 112 is placed around rim 102 in the deflated state and then inflated, the decrease in major diameter 302 of inner tube 112 from major diameter 302a to major diameter 302b may cause inner tube 112 to pull itself toward rim 102's dropped center and thus inner tube 112 may seat firmly against rim 102. In contrast, in a conventional inner tube, as the tube inflates, the major diameter may also increase, thus causing the inner tube to move away from the rim instead of against the rim during inflation.

In some embodiments, inner tube 112 may be configured to decrease its major diameter as it inflates by incorporating a fibrous helical reinforcement with the flexible material of encasing 113 of inner tube 112 (e.g., rubber). The helical reinforcements may provide encasing 113 of inner tube 112 with a relatively stiff tension but may also remain flexible enough to conform to upper bridge 120 and flanges 118 of rim 102. For example, the fibers in the reinforcement may be such that inner tube 112 may be able to stretch "length" wise when substantially deflated to fit inner tube 112 around rim 102. However, as inner tube 112 is inflated, the fibers may attempt to align themselves to hold the largest amount of air within volume 124 of inner tube 112, thus constricting the major diameter of inner tube 112.

Figure 3C:
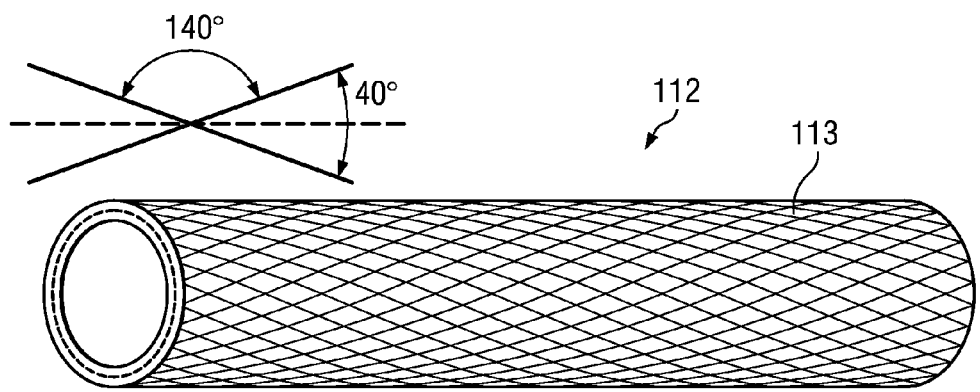
Figure 3D:
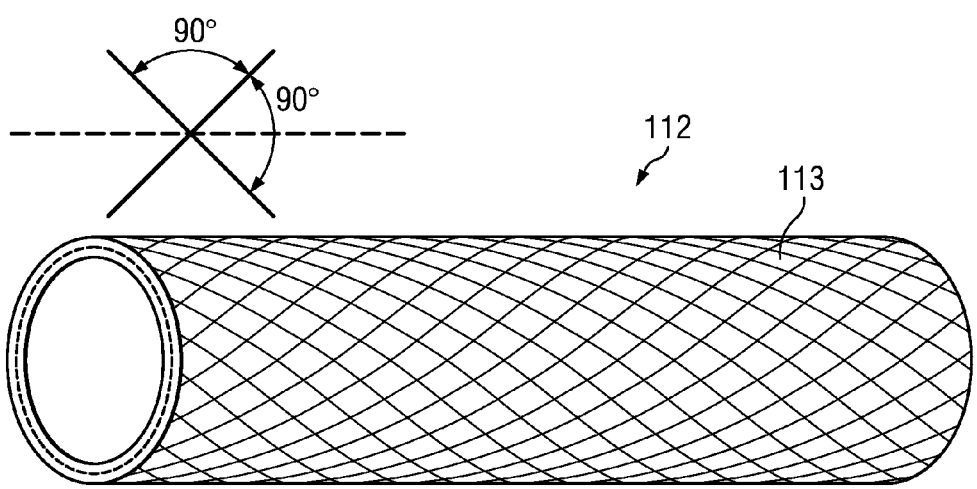

FIGS. 3C and 3D more fully illustrate this realignment. As shown in FIG. 3C, when encasing 113 is substantially deflated and somewhat stretched "lengthwise," the angles between the fibers in the helical reinforcement may be at somewhat shallow angles (e.g., 140°/40°, as shown in FIG. 3C. However, as encasing 113 is inflated, the angles between the fibers may increase such that the fibers may be more orthogonal to each other, as shown in FIG. 3D. However, as the fibers move toward a more orthogonal alignment, they may pull encasing 113 in along its "length" such that the major diameter of inner tube 112 may decrease. Therefore, encasing 113 may be configured such that it may pull itself toward rim 102 when inflated to help ensure that inner tube 112 stays in place to help maintain the seal between beads 116 of tire 108 and flanges 118 of rim 102.

Modifications, additions, or omissions may be made to the tire system described with respect to FIGS. 1-3. For example, in some embodiments, pressure valve 114 may also be configured to act as a two-way valve such that if the pressure within volume 126 is sufficiently high with respect to the pressure within volume 124, pressure valve 114 may open to allow air to pass from volume 126 to volume 124. Such a feature may allow for deflation of both volumes 126 and 124 through valve 110 of inner tube 112 instead of possibly having to dislocate beads 116 of tire 108 to deflate volume 126 in some instances. In alternative embodiments, inner tube 112 may include two one-way pressure valves 114. One of the pressure valves 114 may be configured to allow air to pass from volume 124 to volume 126 during inflation of volumes 124 and 126. The other pressure valve 114 may be configured to allow air to pass from volume 126 to volume 124 during deflation of volumes 124 and 126. Additionally, inner tube 112 and its associated encasing 113 may be manufactured using any suitable process.

Figure 4:
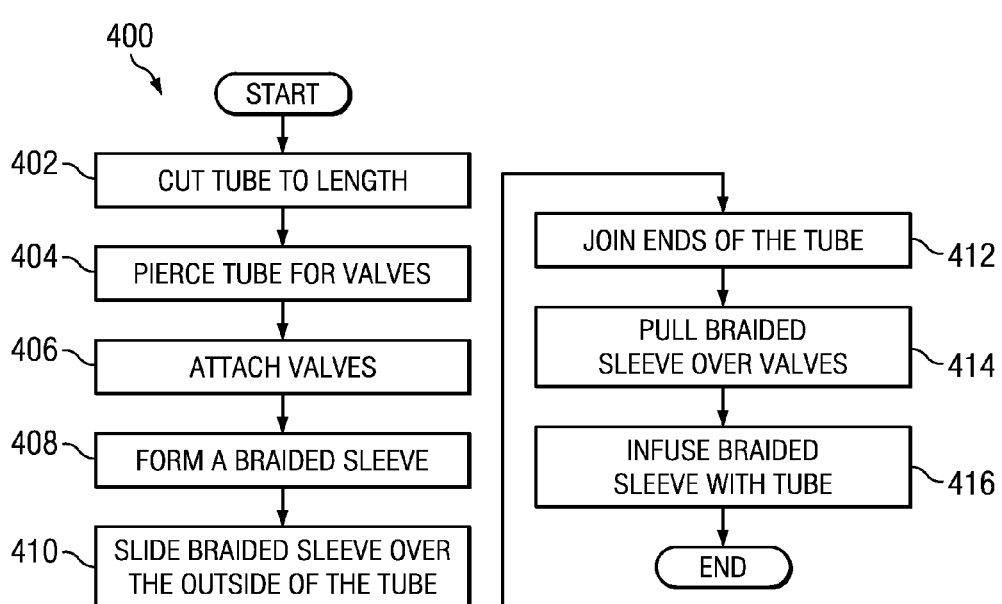
FIG. 4 illustrates an example method of manufacturing an inner tube according to some embodiments of the present disclosure.

FIG. 4 illustrates a method 400 for manufacturing inner tube 112 according to some embodiments of the present disclosure. The steps of method 400 may be performed by any suitable machine, apparatus or device of manufacture. For purposes of the present disclosure, method 400 is described with respect to manufacturing inner tube 112; however, method 400 may be used to manufacture any suitable inner tube.

Method 400 may start, and at step 402, material formed in the shape of a tube may be cut to have a length of the desired major circumference of inner tube 112 (based on the desired major diameter of inner tube 112) when inner tube 112 is deflated. The tube material may be made out of any natural or synthetic rubber or elastomer suitable for convenient molding and for holding air. For example, the tube may be made out of polyurethane, polyolefin, thermoplastic polyamides, styrenic copolymers, silicone, etc.

At step 404, the cut tube may be pierced with holes for placement of valve 110 and pressure valve 114. At step 406, valve 110 and pressure valve 114 may be attached to the tube at the holes using any suitable method. For example, valve 110 and pressure valve 114 may be glued on the tube at the holes.

At step 408 a braided sleeve may be formed of any suitable type of fiber with relatively high stiffness in tension (e.g., nylon, polyester, aramid (e.g., Kevlar), cotton, hemp, plastic, etc.). The braided sleeve may be formed in a generally tubular structure. The braided sleeve may be configured such that as the diameter of the tubular structure increases, the length of the tubular structure may decrease. Therefore, when the braided sleeve is formed into a circular structure (e.g., an inner tube), as the diameter of the tubular structure included in the circular structure (i.e., the minor diameter of the circular structure) increases, the overall diameter of the circular structure (i.e., the major diameter of the circular structure) may decrease. In some embodiments, the braided sleeve may be configured to have a substantially helical configuration as illustrated and described above.

At step 410, the braided sleeve may be slid over the outside of the cut tube material. At step 412, the ends of the tube material may be joined such that the tube material is formed into the shape of inner tube 112. The ends of the tube material may be joined using any suitable method such as using a "butt weld." Additionally, the ends of the braided sleeve associated with the connected ends of the tube material may be connected by overlapping the braids at the ends.

At step 414, the braid may be pulled over valves 110 and 114 such that valves 110 and 114 poke through the weave. By poking valves 110 and 114 through the weave, the reinforcing structure may substantially surround valves 110 and 114 to allow for better performance by the reinforcing structure. Additionally, poking valves 110 and 114 through the weave instead of cutting holes through the weave may help maintain the integrity of the structure because broken strands in the structure (due to cutting) may create a weakness in the structure and tube.

At step 416, the braided sleeve may be infused with the tube material. In some embodiments, this may be accomplished by inflating inner tube 112 inside of a heated mold to vulcanize and cure the tube material (e.g., rubber). During the vulcanizing and curing, the tube material may also be infused with the fibers of the braided sleeve. Therefore, the braided sleeve may be integrated with the material of inner tube 112 and may, thus, manipulate the size of inner tube 112 by causing the major diameter of inner tube 112 to decrease when the minor diameter of inner tube 112 increases (e.g., during inflation). Following step 416, inner tube 112 may be removed from the mold, and method 400 may end Modifications, additions or omissions may be made to method 400 without departing from the scope of the present disclosure. For example, in some embodiments, the braided sleeve may be coated with an uncured rubber and the sleeve and uncured rubber may be placed in a mold for curing. Additionally, in some instances a non-braided material may be wrapped around the tube material more in the style of a conventional tire casing than by placing a braided sleeve over the material. For example, unidirectional reinforcement fibers may be wrapped around the tube material in one direction with an overlapping seam running around the tube material in another direction similar to a bicycle tire casing to create layers of helical fibers, one above the other, rather than a woven structure of a braid.

Accordingly, as described in detail above, inner tube 112 may be configured to secure tire 108 to rim 102 in such a manner to provide benefits associated with both traditional inner tube and traditional tubeless systems while reducing the disadvantages associated with such systems. Additionally, pressure valve 114 and the configuration of inner tube 112 to have a smaller major diameter when inflated may reduce or eliminate problems associated with prior art hybrid systems.

Although the present disclosure has been described in detail, it should be understood that various changes, substitutions, and alterations can be made hereto without departing from the spirit and the scope of the disclosure as defined by the appended claims. For example, although the present disclosure has been described with respect to bicycle tires, it is understood that the principles and teachings of the present disclosure may be applied to any suitable pneumatic tire system.

What is claimed is:

1. An inner tube comprising:
   an encasing to hold air and comprising a reinforcing structure, wherein, when the encasing is inflated, an overall major diameter of the encasing is reduced;
   an inflation valve coupled to the encasing to allow inflation of the encasing; and
   a pressure valve coupled to the encasing to be biased closed and allow air to leave the encasing when a differential pressure between inside of the encasing and outside of the encasing reaches a first threshold pressure level.

2. The inner tube of claim 1, wherein the encasing is to:
   seat within a channel at the periphery of a rim of a wheel, the wheel having a tire seated between lateral flanges of the channel and the inner tube;
   substantially fill the channel when inflated to substantially create a seal between the tire and the lateral flanges of the channel when the inner tube is inflated and seated within the channel with the tire; and
   fill, when inflated, less than a volume defined between the channel and an inner surface of the tire.

3. The inner tube of claim 2, wherein the first threshold pressure level creates the seal between the tire and the lateral flanges.

4. The inner tube of claim 1, wherein the pressure valve includes a spring to:
   bias the pressure valve closed when the differential pressure is less than the first threshold pressure level; and
   open the pressure valve when the differential pressure reaches the first threshold pressure level.

5. The inner tube of claim 1, wherein the inflation valve comprises a Schrader valve.

6. The inner tube of claim 1, wherein the inflation valve comprises a Presta valve.

7. The inner tube of claim 1, wherein the pressure valve comprises a two-way valve to allow air to enter the encasing when the differential pressure between inside of the encasing and outside of the encasing reaches a second threshold pressure level that is greater than the first threshold pressure level.

8. The inner tube of claim 1, wherein the reinforcing structure comprises fibers arranged in a helical configuration.

9. The inner tube of claim 1, wherein the reinforcing structure allows for the encasing to be stretched along the length of the encasing.

10. The inner tube of claim 1, wherein the encasing and the reinforcing structure are sized to seat the inner tube tighter against the channel when the encasing is inflated than when the encasing is deflated.

11. A wheel comprising:
    an inner tube comprising:

an encasing to hold air and comprising a reinforcing structure, wherein, when the encasing is inflated, an overall major diameter of the encasing is reduced;

an inflation valve coupled to the encasing to allow inflation of the encasing; and a pressure valve coupled to the encasing to be biased closed and allow air to leave the encasing when a differential pressure between inside of the encasing and outside of the encasing reaches a first threshold pressure level; and a rim at a periphery of the wheel, the rim comprising a channel including lateral flanges to receive the inner tube; and a tire seated between the inner tube and the lateral flanges of the channel, wherein the tire and the rim enclose the inner tube in a volume defined between the channel and an inner surface of the tire.

12. The wheel of claim 11, wherein the inner tube is to:
substantially fill the channel when inflated to seal the tire against the lateral flanges of the channel; and
fill, when inflated, less than a volume defined between the channel and an inner surface of the tire.

13. The wheel of claim 11, wherein the first threshold pressure level seals the tire against the lateral flanges.

14. The wheel of claim 11, wherein the pressure valve includes a spring to:
bias the pressure valve closed when the differential pressure is less than the first threshold pressure level; and
open when the differential pressure reaches the first threshold pressure level.

15. The wheel of claim 11, wherein the inflation valve comprises a Schrader valve.

16. The wheel of claim 11, wherein the inflation valve comprises a Presta valve.

17. The inner tube of claim 11, wherein the pressure valve comprises a two-way valve to allow air to enter the encasing when the differential pressure between inside of the encasing and outside of the encasing reaches a second threshold pressure level that is greater than the first threshold pressure level.

18. The inner tube of claim 11, wherein the reinforcing structure comprises fibers arranged in a helical configuration.

19. The inner tube of claim 11, wherein the reinforcing structure allows for the encasing to be stretched along the length of the encasing.

20. The inner tube of claim 11, wherein the encasing and the reinforcing structure are sized to seat the inner tube tighter against the channel when the encasing is inflated than when the encasing is deflated.

* * * * *